April 22, 1924.
L. D. SOUBIER
MEANS TO PRODUCE CHARGES OF HOT GLASS
Original Filed June 1, 1920
1,490,946
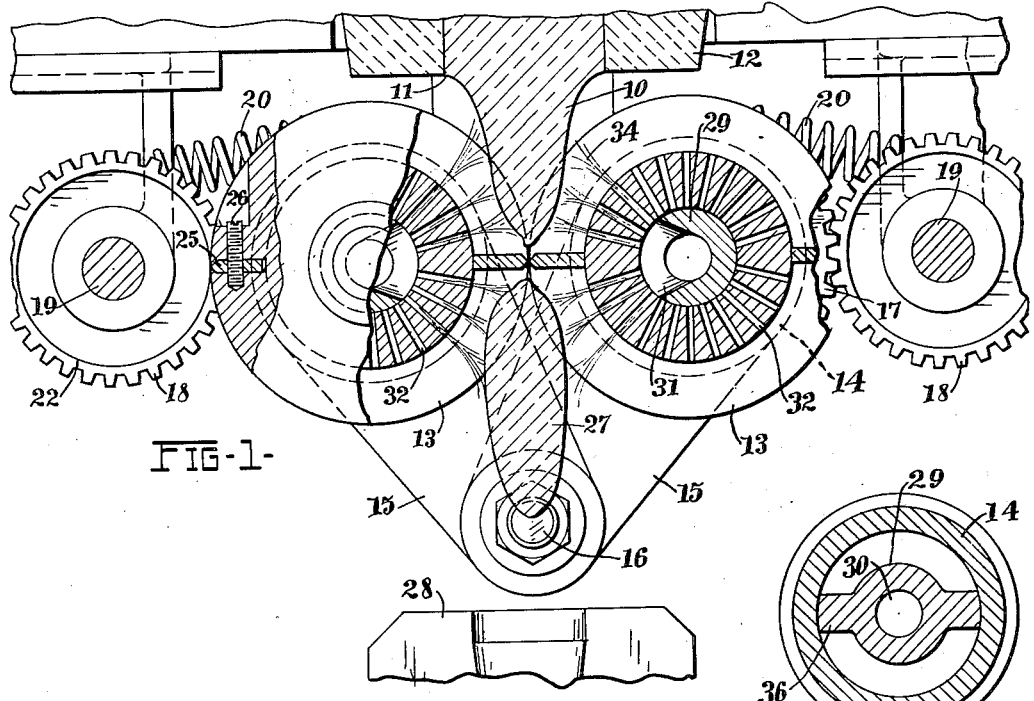
FIG-1-
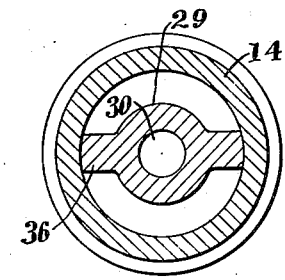
FIG-3-
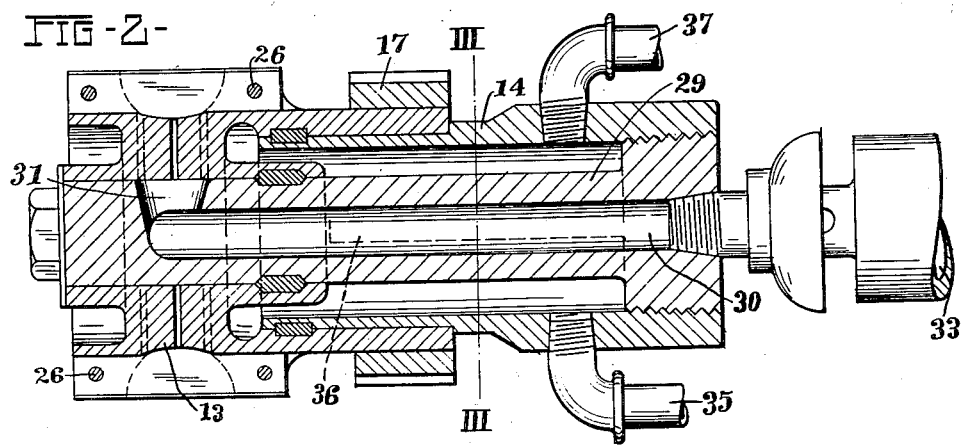
FIG-2-
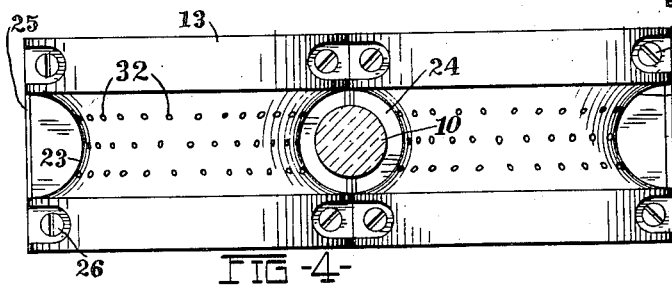
FIG-4-
INVENTOR
Leonard D. Soubier
By J. F. Rule.
His attorney.

Patented Apr. 22, 1924.

1,490,946

UNITED STATES PATENT OFFICE.

LEONARD D. SOUBIER, OF TOLEDO, OHIO, ASSIGNOR TO THE OWENS BOTTLE COMPANY, OF TOLEDO, OHIO, A CORPORATION OF OHIO.

MEANS TO PRODUCE CHARGES OF HOT GLASS.

Original application filed June 1, 1920, Serial No. 385,590, now Patent No. 1,453,290, dated May 1, 1923. Divided and this application filed December 18, 1922. Serial No. 607,480.

*To all whom it may concern:*

Be it known that I, LEONARD D. SOUBIER, a citizen of the United States, residing at Toledo, in the county of Lucas and State of Ohio, have invented new and useful Improvements in Means to Produce Charges of Hot Glass, of which the following is a specification.

My invention relates to means for feeding molten glass from a container and forming it into gobs or mold charges of suitable size, shape and condition for entering the molds of a glass forming machine. It is at present customary to cause glass to flow or issue from an outlet opening in a container and periodically sever the glass to form individual masses or gobs which are introduced into the molds.

An object of my invention is to provide suitable means acting on the descending column or stream of glass to shape and sever it into individual gobs or mold charges of suitable conformation, at the same time subjecting the surface of the charges to a heat treatment by which any shear marks, chilling effects of the cutters, or other undesirable chilling of the glass is prevented. These shaping, severing and heating operations take place without interrupting the continuous and substantially uniform flow of glass.

Other features and advantages of the invention will appear hereinafter.

The present application is a division of my copending application Serial Number 385,590, method of and means for feeding molten glass, filed June 1, 1920, now Patent No. 1,453,290, issued May 1, 1923.

In the accompanying drawings:

Figure 1 is a part sectional elevation of mechanism embodying the principles of my invention.

Figure 2 is a longitudinal sectional elevation through one of the rolls and its supporting member.

Figure 3 is a section at the line III—III on Figure 2.

Figure 4 is a plan view of the forming rolls shown in Figure 1, and also shows the glass in section.

The molten glass 10 issues from an outlet opening 11 in the bottom of a container 12 and flows downwardly through a passageway provided by a pair of shaping rolls 13. The rolls are mounted for continuous rotation on a pair of non-rotating cylindrical carriers or drums 14. These drums are provided with arms 15 pivotally supported on a stationary pivot rod 16. The rolls 13 are rotated by means of gears 17 fixed to the rolls and running in mesh with gears 18 carried on drive shafts 19. The peripheries of the rolls 13 are held together under a yielding pressure applied by means of springs 20 operating through rolls 22 mounted on the shafts 19 and having their peripheries in rolling contact with the rolls 13.

The peripheries of the rolls 13 are formed with recesses 23, herein shown as semi-circular, so that there is provided between the contacting surfaces of the rolls a circular passageway 24 through which the glass descends. Cutter blades 25 are mounted in the rolls 13 preferably at diametric opposite positions and are secured by screws 26. These blades extend across the recesses 23 and are so arranged that as the rolls rotate, the cutting edges are brought together and sever the glass, as indicated in Figure 1. The severed gob 27 drops into a mold 28.

Each of the roll-supporting drums 14 is mounted on a stem 29 having a passageway 30 extending longitudinally therein and terminating at its outer end in a radial passageway 31 extending through the side wall of the stem. The rolls 13 are provided with a multiplicity of radial passageways or openings 32 which extend from the central opening of the roll to the surfaces of the gob forming cavities 23. Each roll 13 fits closely on its stem 29 and as the roll rotates, the openings 32 are successively brought into register with the passageway 31. A combustible gas supplied through a pipe 33, flows through the passageway 30, 31, and openings 32. This gas as it emerges from said openings is burned, thereby enveloping the glass in an intensely hot flame 34 as it passes between the forming rolls. The pressure of the burning gases may be sufficient to prevent actual contact of the glass with the rolls, the passageway 24 preferably being slightly larger in diameter than the column of glass passing therethrough. The burning gas while forming a cushion between the glass and the surface of the rolls permits the latter to shape the glass so that it conforms to the shaping surfaces 23. The effect of the flame is to prevent or eliminate any shear mark or chilling effect of the cutter, and prevent undue cooling of the glass, or where desired, to raise the temperature of the glass and leave it in suitable condition to readily conform to the shape of the molds.

Means for circulating a cooling liquid comprises an intake pipe 35 opening into the bottom of the drum 14. The stem 29 is formed with longitudinal flanges 36 by which the hollow space within the drum is separated into lower and upper compartments. The water or other cooling fluid flows forward through the lower compartment and after passing beyond the flanges or partition walls 36, moves upward and is returned through the upper compartment to the outlet pipe 37.

Modifications may be resorted to within the spirit and scope of my invention.

What I claim is:

1. The combination with means to flow a stream or column of molten glass, of a pair of forming rolls arranged to embrace the flowing glass and formed with shaping or molding recesses in their peripheries, and means to supply burning gas to envelop the glass as it passes between the rolls.

2. The combination of a pair of rolls running with their peripheries in contact and having gob forming cavities in their peripheries, and means to supply burning gas to said cavities.

3. The combination of a roll, a stationary hollow stem on which the roll is mounted for rotation, a multiplicity of radial openings or passageways extending through the roll from said stem to the periphery of the roll, and means for supplying a combustible gas through the stem to said perforations.

4. The combination of a roll, a stationary hollow stem on which the roll is mounted for rotation, a multiplicity of radial openings or passageways extending through the roll from said stem to the periphery of the roll, and means for supplying a combustible gas through the stem, the latter having a lateral passageway from its center to its periphery, whereby during the rotation of the roll said perforations are brought successively into communication with said lateral opening.

5. The combination of means to flow a stream of molten glass, means forming a channel through which the glass descends, and means to provide burning gases to envelop the glass in its passage through said channel and under sufficient pressure to guide and control the path of the glass.

6. The combination of means to flow a stream of molten glass, means forming a channel through which the glass descends, means to provide burning gases to envelop the glass in its passage through said channel, and means to cause the walls of the channel to move downward with the descending glass.

7. The combination of means for flowing a stream of molten glass, forming means to surround the stream and moving downward with the glass, and means to supply a guiding pressure between said forming means and the glass.

8. The combination with means to flow a stream or column of molten glass, of a pair of forming rolls provided with recesses in their peripheries arranged to embrace the flowing glass, and means to supply burning gas to envelop the glass as it passes between the rolls.

Signed at Toledo, in the county of Lucas and State of Ohio, this 15th day of December, 1922.

LEONARD D. SOUBIER.